United States Patent
Kim et al.

(10) Patent No.: US 10,162,212 B2
(45) Date of Patent: Dec. 25, 2018

(54) PATTERNED RETARDER TYPE STEREOSCOPIC IMAGE DISPLAY DEVICE AND METHOD FOR MANUFACTURING THE SAME

(71) Applicant: LG DISPLAY CO., LTD., Seoul (KR)

(72) Inventors: Jin-Yeong Kim, Gyeonggi-do (KR); Hee-Young Chae, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 810 days.

(21) Appl. No.: 13/685,923

(22) Filed: Nov. 27, 2012

(65) Prior Publication Data
US 2014/0009702 A1  Jan. 9, 2014

(30) Foreign Application Priority Data

Jul. 4, 2012 (KR) .................. 10-2012-0072935

(51) Int. Cl.
*G02F 1/1335* (2006.01)
*G02B 27/22* (2018.01)
*G02F 1/1333* (2006.01)

(52) U.S. Cl.
CPC ... *G02F 1/133514* (2013.01); *G02B 27/2214* (2013.01); *G02F 1/133512* (2013.01); *G02F 2001/133388* (2013.01)

(58) Field of Classification Search
CPC .................. G02F 1/133512; G02F 1/133509
USPC .................................... 349/15, 106
See application file for complete search history.

(56) References Cited

U.S. PATENT DOCUMENTS

| 6,181,406 B1* | 1/2001 | Morimoto ........... G02F 1/13394 349/106 |
| 6,476,890 B1* | 11/2002 | Funahata .......... G02F 1/133512 349/110 |
| 7,030,947 B2* | 4/2006 | Moon et al. ................... 349/110 |
| 2002/0054253 A1* | 5/2002 | Cho et al. ..................... 349/110 |

(Continued)

FOREIGN PATENT DOCUMENTS

| JP | 2010-055043 A | 11/2010 |
| KR | 1020020031984 A | 5/2002 |
| KR | 1020080060401 A | 7/2008 |

OTHER PUBLICATIONS

Office Action dated Jul. 30, 2013 from the Korean Intellectual Property Office in counterpart Korean application No. 10-2012-0072935.

*Primary Examiner* — Paul Lee
*Assistant Examiner* — Agnes Dobrowolski
(74) *Attorney, Agent, or Firm* — Morgan, Lewis & Bockius LLP (57) ABSTRACT

A stereoscopic image display device includes an array substrate defining an active area and a non-active area surrounding the active area; a gate line on the active area and the non-active area; a gate pad on the non-active area; a dummy line defining a dummy pixel on the non-active area by crossing the gate line; a color filter substrate disposed opposing the array substrate with a liquid crystal layer therebetween, the color filter substrate having a color filter and a dummy color filter at a portion corresponding to the dummy pixel; a black stripe on the color filter substrate on a side away from the array substrate, the black stripe disposed at portions corresponding to the non-active area along edges of the active area; and a patterned retardation film formed over the black stripe.

22 Claims, 5 Drawing Sheets

(56) References Cited

U.S. PATENT DOCUMENTS

| | | | | |
|---|---|---|---|---|
| 2004/0032557 | A1* | 2/2004 | Lee | G02F 1/136286 |
| | | | | 349/141 |
| 2005/0243232 | A1* | 11/2005 | Park | G02F 1/1362 |
| | | | | 349/43 |
| 2005/0264721 | A1* | 12/2005 | Lee et al. | 349/106 |
| 2008/0088788 | A1* | 4/2008 | Cho et al. | 349/160 |
| 2008/0252829 | A1* | 10/2008 | Chae | G02F 1/133516 |
| | | | | 349/106 |
| 2010/0033557 | A1* | 2/2010 | Abe | G02B 27/26 |
| | | | | 348/58 |
| 2011/0156995 | A1* | 6/2011 | Choi | G02F 1/134363 |
| | | | | 345/92 |
| 2013/0063687 | A1* | 3/2013 | Jang | H04N 13/0422 |
| | | | | 349/106 |

* cited by examiner

PATTERNED RETARDER TYPE STEREOSCOPIC IMAGE DISPLAY DEVICE AND METHOD FOR MANUFACTURING THE SAME

The present application claims the benefit of Korean Patent Application No. 10-2012-0072935 filed in Republic of Korea on Jul. 4, 2012, which is hereby incorporated by reference.

BACKGROUND

Field of the Disclosure

The present disclosure relates to a stereoscopic image display device, and more particularly, to a patterned retarder type stereoscopic image display device.

Discussion of the Related Art

Recently, due to developments of various video contents, stereoscopic image display devices which the user may select the display type (two- or three-dimensional) display have been introduced. The three-dimensional display can be accomplished using the stereoscopic technique or the autostereoscopic technique.

The stereoscopic technique uses a binocular disparity due to a separation distance between the eyes. This type can be divided into the glasses type and the glasses-free type. Among the glasses type, there is a stereoscopic image display device where a patterned retarder is disposed on a display panel. This type of device accomplishes three-dimensional display using polarization properties of the patterned retarder on the display panel and those on the glasses. They have advantages in having small cross-talk between two eyes and in having good display quality of high brightness compared to other types.

At this time, the display panel for displaying both two-dimensional and three-dimensional images can be one of the various flat panel display devices such as the liquid crystal display (LCD) device, the field emission display (FED) device, the plasma display panel (PDP), the Electrophoresis (EPD), or the electroluminescence device (EL) including the inorganic electroluminescence device and the organic light emitting display (OLED) device.

Figure 1:
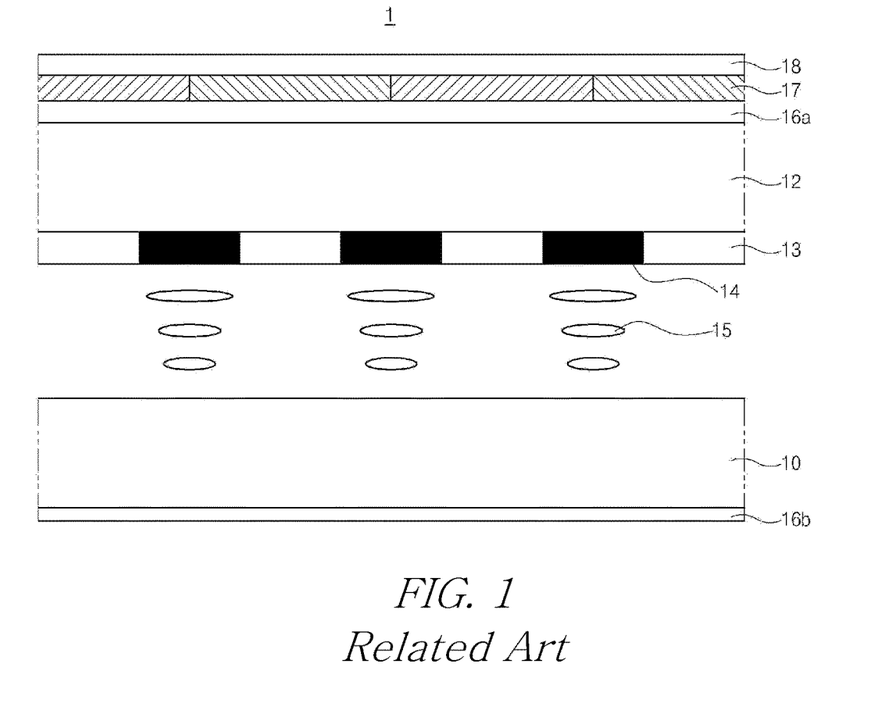
FIG. 1 is a schematic view of a patterned retarder type stereoscopic image display device according to the related art.

As one example, a display panel of an LCD device will be explained. FIG. 1 is a schematic view of patterned retarder type stereoscopic image display device according to the related art.

As shown in FIG. 1, the display device 1 has a display panel 20 for displaying a two-dimensional image or three-dimensional image and a patterned retarder 17 attached to the display panel 20. The display panel includes an array substrate 10 and a color filter substrate 12 having a color filter 13 and a black matrix 14, a liquid crystal layer 15 between the array substrate 10 and the color filter substrate 12, and first and second polarizing plates 16a and 16b attached to the color filter substrate 12 and to the array substrate 10, respectively. The patterned retarder 17 is attached to the first polarizing plate 16a, and has a first retarder for selectively transmitting only first polarizing light and a second retarder for selectively transmitting only second polarizing light. The first and second retarders are formed line-by-line in turns. At this time, a protection film 18 may be formed on the patterned retarder 17.

The display device 1, as described, alternately displays a right-eye image and left-eye image on the display panel, and switches the polarizing properties from the polarizing glasses though the patterned retarder 17. The viewer combines the left-eye image and the right-eye image respectively transmitted to the left-eye and the right-eye and realizes a three-dimensional stereoscopic image.

When the three-dimensional stereoscopic image is accomplished, a three-dimensional (3D) cross-talk can occur according to the viewing positions. That is, when users see the display panel in an up-and down direction, the left-eye image may pass not only the first retarder but also the second retarder and get mixed with the right-eye image. And similarly, the right-eye image may become mixed with the light-eye image.

Meanwhile, a light leakage problem generally exists in the display panel. Light from the backlight unit leaks around the front or side of the display panel. To solve the problem, additional black matrix is formed on the non-active area of the display panel. To fulfill the purpose, it is necessary that the black matrix satisfy insulation characteristics, or that a dielectric constant should be below 3.0. However, pigment for the black matrix is generally carbon black, which does not have enough insulation characteristics. Thus, although it is possible to reduce light reflection, it cannot block the passing of light.

SUMMARY

Accordingly, the present disclosure is directed to a stereoscopic image display device that substantially obviates one or more of the problems due to limitations and disadvantages of the related art.

An object of the present disclosure is to provide a stereoscopic image display device that can improve viewing angle and reduce the cross talk phenomenon.

Another object of the present disclosure is to provide a stereoscopic image display device that can solve the light leakage problem using even transparent column spacers.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a stereoscopic image display device includes an array substrate defining an active area and a non-active area surrounding the active area; a gate line on the active area and the non-active area; a gate pad on the non-active area; a dummy line defining a dummy pixel on the non-active area by crossing the gate line; a color filter substrate disposed opposing the array substrate with a liquid crystal layer therebetween, the color filter substrate having a color filter and a dummy color filter at a portion corresponding to the dummy pixel; a black stripe on the color filter substrate on a side away from the array substrate, the black stripe disposed at portions corresponding to the non-active area along edges of the active area; and a patterned retardation film formed over the black stripe.

In another aspect, a stereoscopic image display device includes an array substrate defining an active area having a plurality of unit pixels and a non-active area surrounding the active area; a plurality of dummy common lines and a gate pad on the non-active area of the substrate; a gate insulation layer on the dummy common lines and the gate pad; a dummy line formed on the gate insulation layer at portions corresponding to the dummy common lines; a color filter substrate disposed opposing the array substrate with a liquid crystal layer therebetween, the color filter substrate having a color filter and a dummy color filter at a portion corresponding to the dummy pixel; a black stripe on the color filter substrate on a side away from the array substrate, the black stripe disposed at portions corresponding to the non-active area along edges of the active area; and a patterned retardation film formed on the black stripe.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments, examples of which are illustrated in the accompanying drawings.

Figure 2:
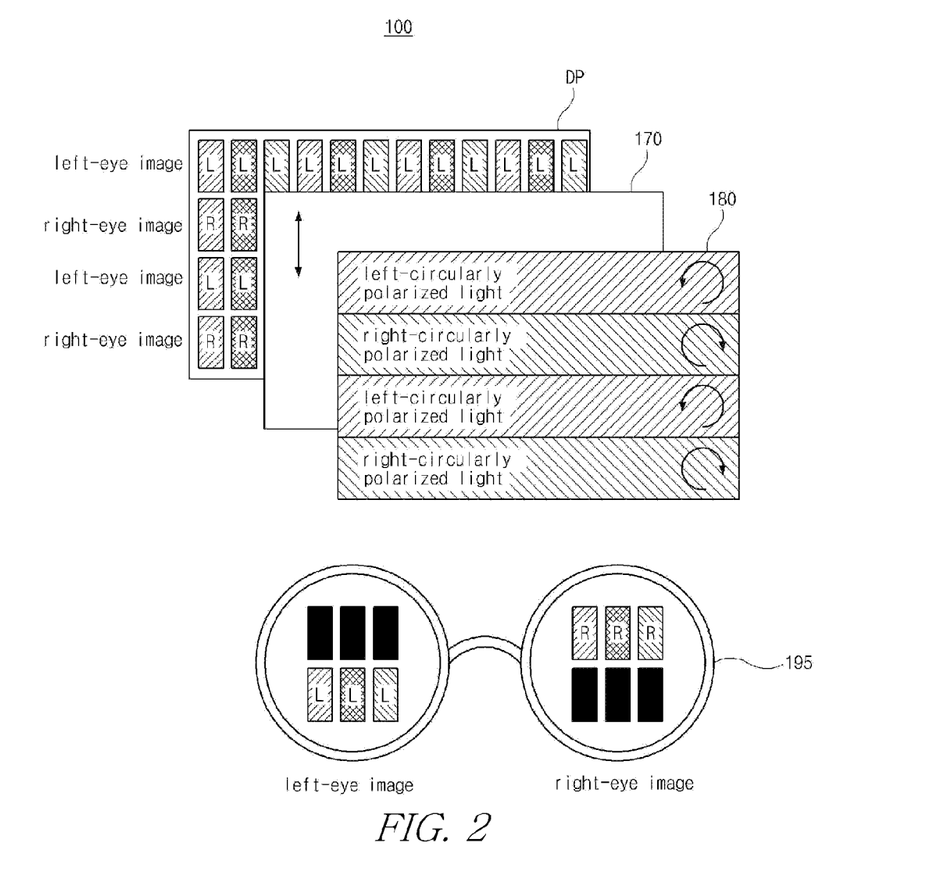
FIG. 2 is a drawing illustrating a patterned retarder stereoscopic image display device according to an example of a first embodiment.

FIG. 2 is a drawing showing of a patterned retarder stereoscopic image display device according to an example of a first embodiment. As shown in FIG. 2, the stereoscopic image display device includes a display panel (DP), a polarizing plate 170, a patterned retarder 180, and a pair of polarization glasses 195. If a liquid crystal display panel is used for the display panel (DP), the stereoscopic image display device further includes a backlight unit under the display panel (DP) and a polarizing plate (not shown) between the display panel (DP) and the backlight unit.

The patterned retarder 180 and the polarization glasses separate the right-eye image and the left-eye image and enables left-eye and right-eye images of display from the display panel to have different phases from each other.

Though not shown in drawings, the display panel (DP) has two substrates and a liquid crystal layer between them. On the first substrate, a thin film transistor array and a color filter are formed. On the second substrate opposing the first substrate, a polarizing plate 170 is attached. Another polarizing plate (not shown) is also attached on the first substrate. The display panel (DP) displays a right-eye image and a left-eye image in turns in a form of line-by-line.

The polarizing plate 170 is an analyzer that is attached on the second substrate of the display panel (DP) and transmits specified linearly polarized light of the emitted light from the liquid crystal layer of the display panel (DP).

A patterned retarder 180 has first and second retarders disposed in turns in a form of line by line for each other. Each of the retarders preferably has an optical axis of +45° and −45° with respect to a transmission axis of the polarizing plate 170. Thus the optical axis of the first retarder and the optical axis of the second retarder cross each other perpendicularly.

Each of the retarders may have a phase difference of λ/4 (quarter wave) using birefringence medium. That is, the first retarder is disposed on the display panel (DP) to oppose the line displaying left-eye images and converts the light of the left-eye image to a first polarization light (a circularly polarized light or a linearly polarized light). The second retarder is disposed on the display panel (DP) to oppose the line displaying right-eye images and converts the light of the right-eye image to a second polarization light (a circularly polarized light or a linearly polarized light).

As one example, the first retarder functions as a polarizing filter transmitting a left circularly polarized light and the second retarder functions as a polarizing filter transmitting a right circularly polarized light.

Attached to the left glass of the polarization glasses 195, a polarizing film transmits only a first polarizing light. Attached to the right glass of the polarization glasses 195, a polarizing film transmits only a second polarizing light. That is, the user wearing the pair of polarizing glasses 195 sees only left-eye images through the left eye and sees only right-eye images through the right eye. Therefore, the user recognizes the image on the display panel (DP) as a stereoscopic image.

Hereinafter, the first substrate of a stereoscopic image display device according to the first embodiment will be explained. An array substrate having a dummy pixel and a pad as well as a stereoscopic image display device having such an array substrate will be described in detail.

Figure 3:
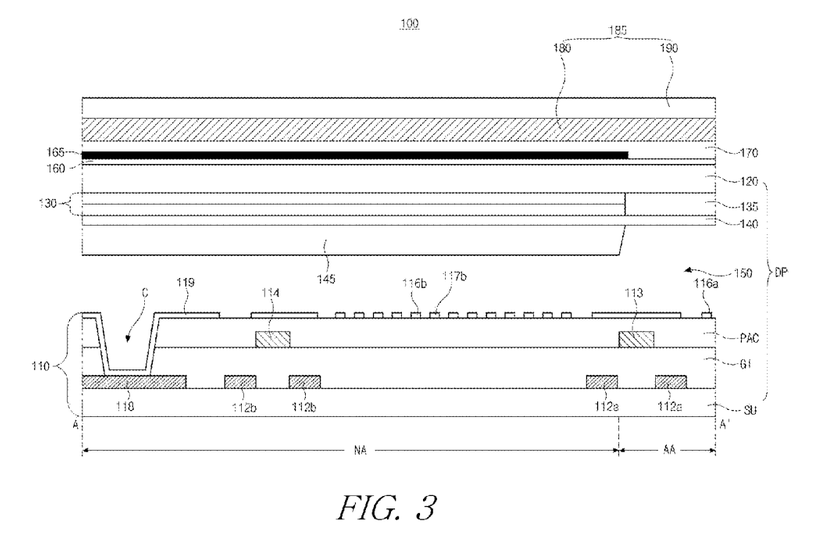
FIG. 3 is a cross-sectional view of a stereoscopic image display device according to the first embodiment.

FIG. 3 is a cross-sectional view of a stereoscopic image display device according to the first embodiment.

As shown in FIG. 3, a common electrode 117a and a pixel electrode 116a are disposed on an array substrate 110, and the liquid crystal is driven by a horizontal electric field occurring by the common electrode 117a and the pixel electrode 116a. On a color filter substrate 120 opposing to the array substrate, a color filter 135 and dummy color filter are disposed. The array substrate 110 has a substrate (SU) defining an active area having a plurality of unit pixels and a non-active area outside of the active area. On the non-active area of the substrate (SU), dummy common lines 112b and a gate pad 118 are disposed. On the dummy common lines 112b and the gate pad 118, a gate insulation layer (GI) is formed, and on the gate insulation layer (GI), a dummy line is disposed to correspond to the dummy common lines 112b.

Also, a display panel (DP) displaying 2D or 3D images and a patterned retardation film 185 attached are included. The display panel (DP) has the array substrate 110, a color filter substrate 120, and a liquid crystal layer 150 between them. On the color filter substrate 120, a rear surface ITO 160, a black stripe 165, a polarizing plate 170, and a patterned retardation film 185 are sequentially disposed.

For example, a plurality of gate lines 111 (of FIG. 4) are formed on the substrate (SU) through photoresist and etching processes. At the same time, on the active area (AA) a gate line (not shown), a plurality of common electrode lines 112a, and on the non-active area (NA) a plurality of dummy common lines 112b and a gate pad 118 are formed.

Next, on the entire substrate having the gate lines 111 (of FIG. 4), the common lines 112a, the dummy common lines 112b, and the gate pad 118, a gate insulating layer (GI) is formed of an inorganic material such as silicon nitride (SiN$_x$) or silicon oxide (SiO$_2$).

In succession, on the active area (AA) of the substrate (SU), a plurality of data lines 113 are formed. The data lines 113 define pixel areas by crossing each other with the gate line s 111 (of FIG. 3). At the same time, on the non-active area (NA), dummy lines 114 and a light leakage blocking layer 115 connected to the dummy lines are formed. The dummy lines 114 define dummy pixels by crossing each other with the gate lines 111 (of FIG. 4).

Next, on the entire substrate (SU) having the data line 113 and dummy lines 114, a protection layer (PAC) is formed of organic material such as benzocyclobuten (BCB) or acryl, or inorganic material such as silicon nitride (SiN$_x$).

In succession, on the contact hole (C) formed by eliminating a determined portion of the protection layer (PAC), a gate pad electrode 119 is formed to be connected to the gate pad 118. At the same time, on the non-active area, plurality of dummy pixel electrodes 116b and plurality of dummy common electrodes 117b are formed.

Also, on the active area (AA) a pixel electrode 116a and a common electrode 117a are formed of non transparent metal on the protection layer (PAC). The pixel electrode 116a and the common electrode 117a can function as a black matrix, thus there is no need to form a black matrix. At this time, the non transparent metal layer (not shown) may further include a low reflection oxide layer thereon, which reduces reflection rate of light from outside of the panel.

On the active area (AA) a thin film transistor (not shown) is formed for each unit pixel. The thin film transistor is turned on by a gate signal from the gate line 111 and transmits data signal from data line 113 to the pixel electrode 116a.

The array substrate 110 and the color filter substrate 120 are attached in a form opposing to each other. The liquid crystal layer 150 is disposed between the two substrates, and the column spacers 140 are provided to maintain a gap between the two substrates are formed.

Next, on the color filter substrate 120, a color filter 135 and an over-coating layer 140 that reduces step differences of the color filter 135 and protects the color filter 135 are formed. The color filter 135 functions to convert light from the liquid crystal layer 150 to red, green, and blue. Each of the color filters 135 is positioned on the boundary of the unit pixels and functions to discern the right-eye image and the left-eye image.

At this time, the stereoscopic image display as described has a color filter 135 disposed in the area corresponding to the unit pixel of the active area (AA) and a dummy color filter disposed in the area corresponding to the dummy pixel of the non-active area (NA). That is, the color filters of red (R), green (G), and blue (B) are sequentially and repeatedly disposed and, at the same time, on the non-active area, red and blue dummy color filters 130 are disposed as a double layer structure. The thickness of the red and blue dummy color filters is about ½ of that of the color filter 135. Therefore, the whole double-layered dummy color filter 130 of the non-active area (NA) has the same thickness of the color filter 135 of the active area (AA).

In order to determine a pre-tilt angle of the liquid crystal, orientation layers (not shown) can be further formed between the liquid crystal layer 150 and each of array and color filter substrates 110 and 120. Alternatively, the over-coating layer 140 can be used as an orientation layer. Also, on the over-coating layer, a column spacer 145 is formed to maintain cell gap for the liquid crystal. At this time, the column spacer 145 is formed of a transparent organic insulation material without any black pigment.

In succession, on the color filter substrate 120, a rear surface ITO 160, a black stripe 165, a polarizing plate 170, and a patterned retardation film 185 are sequentially formed. The polarizing plate 170 is formed on the black stripe 165 and polarizes light from the display panel (DP). A patterned retardation film 185 is disposed on the polarizing plate 170 and includes a protection film 190 and a patterned retarder 180 on the protection film 190.

The rear surface ITO 160 is formed on the entire color filter substrate 120 and discharges static electricity occurring on the color filter substrate 120. But the rear surface ITO 160 may cover the black stripe 165 to function as a protection layer for protecting the black stripe 165.

For example, the black stripe 165 may be formed on the outer surface of the color filter substrate 120 and the rear surface ITO 160 can cover the black stripe 165. Also, an adhesive (not shown) can be formed on the polarizing plate 170, which is attached on the black stripe 165 and the rear surface ITO 160.

The black stripe 165 is formed between the display panel (DP) and the patterned retarder 180, especially corresponding to a boundary area of first and second retarders. The pixel electrode 116a functions as a black matrix, and the black stripe 165 is separated from the pixel electrode 116a by about thickness of the color filter substrate 120. The black stripe 165 overlaps the pixel electrode 116a, which can be called a double black stripe structure. By additionally forming the black stripe 165, the 3D cross-talk of the right-eye image and the left-eye image can be solved, and it is possible to prevent an opening aperture ratio and the chroma from being reduced.

At this time, according to the invention, the black stripe 165 should be elongated to the non-active area (NA). By elongating the black stripe 165 to the non-active area (NA), outside the boundaries of the active area (AA), the light leakage occurring at the outer periphery of the display panel (DP) can be prevented.

Also, the black stripe 165 is formed of non-transparent conductive material, such as molybdenum-tungsten alloy (MoTi) or copper nitride (CuNx), which can prevent static electricity from occurring. Even if the rear ITO 160 is eliminated, the black stripe 165 can block the static electricity instead of the rear ITO 160. These metals have good adhesive properties and anti-abrasion properties.

Consequentially, according to the first embodiment, since the dummy color filter 130 is formed to have a double-layer structure, the light leakage problem occurring on the non-active area (NA) can be solved. Since the dummy color filter 130 is formed simultaneously with the color filters 135 of red, green, and a blue, there is no need of additional process.

Figure 4:
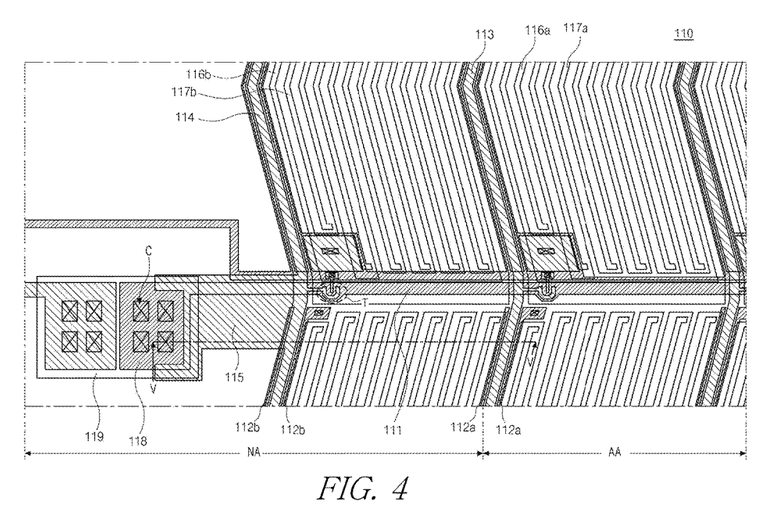
FIG. 4 is a plan view of an array substrate according to an example of a second embodiment.
Figure 5:
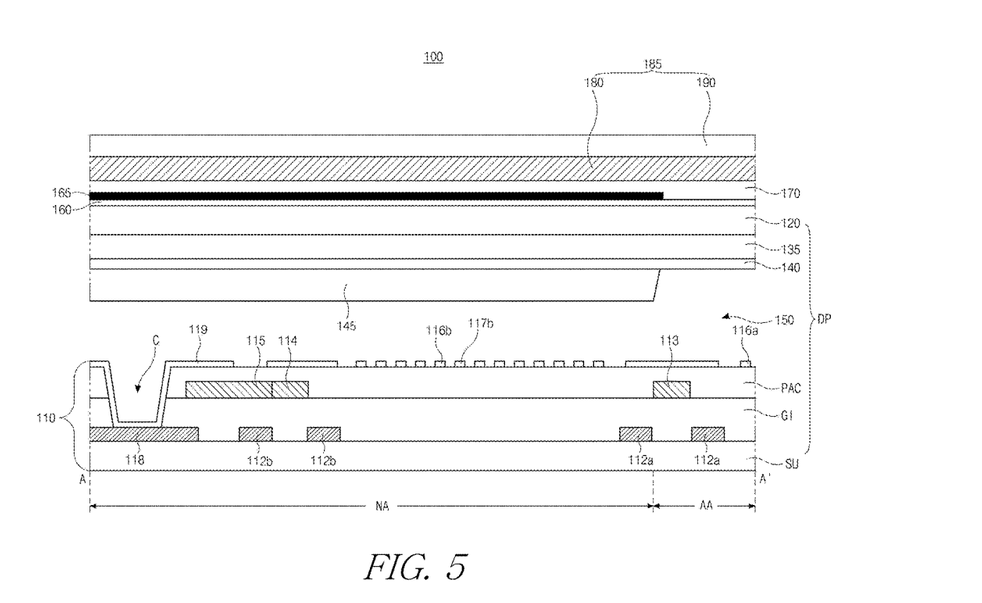
FIG. 5 is a cross-sectional view taken along line V-V of FIG. 4, showing of a patterned retarder stereoscopic image display device.

FIG. 4 is a plan view of an array substrate according to an example of another embodiment, and FIG. 5 is a cross-sectional view taken along V-V of FIG. 4, showing a stereoscopic image display device having the array substrate.

The stereoscopic image display device of FIGS. 4-5 has a light leakage blocking layer 115 instead of the dummy color filter 130 of FIG. 3. The light leakage blocking layer 115 will now be explained. Other elements explained above with regard to the first embodiment are same as in this embodiment.

As shown in FIG. 4, an array substrate 110 includes a gate line 111 formed on an active area and on a non-active area, outside of the active area, a gate pad 118 formed on the non-active area, a dummy line 114 defining a dummy pixel by crossing each other with the gate line 111, and a light leakage blocking layer 115 that is connected to the dummy line 114 and overlaps the gate line and the gate pad 118 on the non-active area. The light leakage blocking layer 115 partially overlaps the gate line 11 and the gate pad.

As shown in FIG. 5, the light leakage blocking layer 115 is formed over the one of the dummy common lines 112b and a portion of the gate pad 118. At this time, to avoid a short with the nearby contact holes (C), the layer 115 should not overlap entirely the gate pad 118 on the non-active area (NA).

Consequentially, the light can be prevented from leaking out between the gate lines by forming the dummy line 114 and the light leakage blocking layer 115 simultaneously on the non-active area. Further, there is no need of additional processes, since the dummy line 114 and the light leakage blocking layer 115 are simultaneously formed.

By elongating the black stripe 165 to the non-active area (NA), the vertical or up-and-down viewing angle can be increased, and the cross-talk can be reduced. Also, light leakage problems can be solved. That is, by additionally forming the dummy lines 114 and light leakage blocking layer 115, display quality can be improved by preventing a bright line error due to light leakage through a side surface of the device.

Further, since it is not necessary to include additional processes to form the non-active area (NA) of the display panel, all light leakage problem through the front surface or side surface of the display panel can be solved, without complicating the manufacturing process, even with adopting the transparent column spacer.

It will be apparent to those skilled in the art that various modifications and variations can be made in a method of fabricating a patterned retarder of the present disclosure without departing from the sprit or scope of the invention. Thus, it is intended that the present invention covers the modifications and variations of this invention provided they come within the scope of the appended claims and their equivalents.

What is claimed is:

1. A stereoscopic image display device, comprising:
   an array substrate defining an active area and a non-active area surrounding the active area, wherein the array substrate includes an inner surface facing a liquid crystal layer and an outer surface opposite to the inner surface;
   a gate line in the active area and the non-active area on the inner surface of the array substrate;
   a gate pad in the non-active area on the inner surface of the array substrate;
   a dummy line defining a dummy pixel in the non-active area on the inner surface of the array substrate by crossing the gate line;
   a color filter substrate disposed opposing the array substrate with the liquid crystal layer therebetween, wherein the color filter substrate includes an inner surface facing the liquid crystal layer and an outer surface opposite to the inner surface, and wherein the color filter substrate defining the active area and the non-active area;
   a color filter and a dummy color filter on the inner surface of the color filter substrate with the dummy color filter at a portion corresponding to the dummy pixel, wherein the dummy color filter directly contacts the inner surface of the color filter substrate;
   a black stripe on the outer surface of the color filter substrate, the black stripe disposed at portions corresponding to the non-active area along edges of the active area, wherein the active area of the color filter substrate is exposed outside the black stripe; and
   a patterned retardation film formed over the black stripe.

2. The device according to claim 1, wherein the dummy color filter includes a double layer of two color filters of different colors with a thickness of each layer of the double layer being about ½ of a thickness of the color filter so that the dummy color filter has about the same thickness as the color filter layer.

3. The device according to claim 2, wherein the dummy color filter includes a double layer of red and blue color filters.

4. The device according to claim 1, wherein the patterned retardation film includes first and second retarders having different polarization states from each other.

5. The device according to claim 4, wherein the black stripe is formed on a boundary area of the first and second retarders.

6. The device according to claim 1, wherein the black stripe includes a non-transparent material.

7. The device according to claim 1, wherein the black stripe includes molybdenum-tungsten alloy (MoTi) or copper nitride ($CuN_x$).

8. The device according to claim 1, further comprising a polarizing plate between the black stripe and the patterned retardation film.

9. The device according to claim 1, where the black stripe extends into a portion corresponding to the non-active area.

10. A stereoscopic image display device, comprising:
    an array substrate defining an active area having a plurality of unit pixels and a non-active area surrounding the active area, wherein the array substrate includes an inner surface facing a liquid crystal layer and an outer surface opposite to the inner surface;
    a plurality of dummy common lines and a gate pad in the non-active area on the inner surface of the array substrate;
    a gate insulation layer on the dummy common lines and the gate pad;
    a dummy line formed on the gate insulation layer over the inner surface of the array substrate at portions corresponding to the dummy common lines;
    a color filter substrate disposed opposing the array substrate with the liquid crystal layer therebetween, wherein the color filter substrate includes an inner surface facing the liquid crystal layer and an outer surface opposite to the inner surface, and wherein the color filter substrate defining the active area and the non-active area;
    a color filter and a dummy color filter on the inner surface of the color filter substrate with the dummy color filter at a portion corresponding to a dummy pixel, wherein the dummy color filter directly contacts the inner surface of the color filter substrate;
    a black stripe on the outer surface of the color filter substrate, the black stripe disposed at portions corresponding to the non-active area along edges of the active area, wherein the active area of the color filter substrate is exposed outside the black stripe; and
    a patterned retardation film formed on the black stripe.

11. The device according to claim 10, wherein the dummy color filter includes a double layer of two color filters of different colors with a thickness of each layer of the double layer being about ½ of a thickness of the color filter so that the dummy color filter has about the same thickness as the color filter layer.

12. The device according to claim 11, wherein the dummy color filter includes double layer of red and blue color filters.

13. The device according to claim 10, wherein the patterned retardation film includes first and second retarders having different polarization states from each other.

14. The device according to claim 13, wherein the black stripe is formed on a boundary area of the first and second retarders.

15. The device according to claim 10, wherein the black stripe includes a non-transparent material.

16. The device according to claim 10, wherein the black stripe includes molybdenum-tungsten alloy (MoTi) or copper nitride ($CuN_x$).

17. The device according to claim 10, further comprising a polarizing plate between the black stripe and the patterned retardation film.

18. The device according to claim 10, where the black stripe extends into a portion corresponding to the non-active area.

19. The device according to claim 10, further comprising a light leakage blocking layer formed on the gate insulating layer adjacent to the dummy line, the light leakage blocking layer overlapping at least one of the dummy common lines and a portion of the gate pad.

20. The device according to claim 1, further comprising a rear surface indium-tin-oxide (ITO) layer between the black stripe and the patterned retarder to cover and protect the black stripe.

21. The device according to claim 10, further comprising a rear surface indium-tin-oxide (ITO) layer between the black stripe and the patterned retarder to cover and protect the black stripe.

22. The device according to claim 10, wherein the dummy pixel is substantially the same size as each of the unit pixels.

* * * * *